(12) United States Patent
Bonnel et al.

(10) Patent No.: US 8,231,269 B2
(45) Date of Patent: Jul. 31, 2012

(54) CULINARY ARTICLE THAT ALLOWS THE DETECTION OF ITS TEMPERATURE VIA A COOKING PLATE

(75) Inventors: Jocelyn Bonnel, Vions (FR); Noël Burais, Villeurbanne (FR)

(73) Assignee: SEB SA, Ecully (FR)

( * ) Notice: Subject to any disclaimer, the term of this patent is extended or adjusted under 35 U.S.C. 154(b) by 646 days.

(21) Appl. No.: 12/307,621

(22) PCT Filed: Jul. 6, 2007

(86) PCT No.: PCT/FR2007/001160
§ 371 (c)(1),
(2), (4) Date: Apr. 16, 2009

(87) PCT Pub. No.: WO2008/003874
PCT Pub. Date: Jan. 10, 2008

(65) Prior Publication Data
US 2009/0252197 A1    Oct. 8, 2009

(30) Foreign Application Priority Data
Jul. 6, 2006   (FR) ...................... 06 06176

(51) Int. Cl.
*A47J 27/00* (2006.01)
*G05D 23/24* (2006.01)
*G01K 7/16* (2006.01)
(52) U.S. Cl. .................. 374/141; 374/165; 219/627
(58) Field of Classification Search .................. 374/141, 374/149, 163, 165, 176, 177, 180; 219/620, 219/621, 627; 220/573.1; 99/342, 343, 344; 340/870.17
See application file for complete search history.

(56) References Cited

U.S. PATENT DOCUMENTS

| | | | | |
|---|---|---|---|---|
| 3,742,178 A * | 6/1973 | Harnden, Jr. | .................. | 219/627 |
| 3,742,179 A * | 6/1973 | Harnden, Jr. | .................. | 219/627 |
| 3,777,094 A * | 12/1973 | Peters, Jr. | ...................... | 219/621 |
| 3,781,506 A * | 12/1973 | Ketchum et al. | ................ | 219/627 |
| 3,786,219 A * | 1/1974 | Kornrumpf et al. | .......... | 219/626 |
| 4,596,236 A | 6/1986 | Eide | ................ | 126/390 |
| 5,487,329 A * | 1/1996 | Fissler | .......................... | 99/403 |
| 5,750,963 A * | 5/1998 | Christensen et al. | .......... | 219/497 |
| 6,206,564 B1 * | 3/2001 | Adamczewski | ............. | 374/141 |
| 6,576,876 B2 * | 6/2003 | Cartossi | ...................... | 219/621 |
| 6,715,631 B2 * | 4/2004 | Kim | .......................... | 220/573.1 |
| 7,446,287 B2 * | 11/2008 | Tominaga et al. | ............ | 219/626 |
| 7,906,748 B2 * | 3/2011 | Imura | .......................... | 219/622 |

(Continued)

FOREIGN PATENT DOCUMENTS

CN     1887150 A  *  1/2007

(Continued)

OTHER PUBLICATIONS

Rapport De Recherche Préliminaire of French Application No. 0606176 mailed Jan. 16, 2007.

(Continued)

*Primary Examiner* — R. A. Smith
(74) *Attorney, Agent, or Firm* — Seyfarth Shaw LLP

(57) ABSTRACT

The invention relates to a culinary article (100) having a bottom (101) in which heat-sensitive means (130) made of electrically conductive materials are placed. According to the invention, the heat-sensitive means (130) are made of non-ferromagnetic materials having a temperature-variable resistivity (p).

23 Claims, 1 Drawing Sheet

U.S. PATENT DOCUMENTS

| | | | |
|---|---|---|---|
| 2003/0178416 A1* | 9/2003 | Fujii et al. | 219/621 |
| 2007/0278216 A1* | 12/2007 | Tominaga et al. | 219/627 |
| 2009/0019833 A1* | 1/2009 | Yonushonis et al. | 60/277 |
| 2009/0212038 A1* | 8/2009 | Ahlander | 219/429 |

FOREIGN PATENT DOCUMENTS

| | | |
|---|---|---|
| DE | 44 13 979 A1 | 10/1995 |
| DE | 100 58 670 A1 | 5/2002 |
| EP | 0 437 356 A2 | 7/1991 |
| EP | 0 648 458 A1 | 4/1995 |
| EP | 0 677 264 A1 | 10/1995 |
| JP | 58 160738 A | 9/1983 |
| JP | 60 238913 A | 11/1985 |
| JP | 04072527 A * | 3/1992 |
| JP | 05 344926 A | 12/1993 |
| WO | WO 9716943 A2 * | 5/1997 |

OTHER PUBLICATIONS

Rapport De Recherche Internationale of PCT/FR2007/001160 mailed Oct. 26, 2007.

Notification De Transmission Du Rapport Préliminaire International Sur La Brevetabilité of PCT/FR2007/001160 mailed Jun. 12, 2008 (English translation included).

* cited by examiner

CULINARY ARTICLE THAT ALLOWS THE DETECTION OF ITS TEMPERATURE VIA A COOKING PLATE

CROSS-REFERENCE TO RELATED APPLICATIONS

This application is a 371 filing of International application no. PCT/FR2007/001160 filed Jul. 6, 2007.

FIELD

This present invention concerns the field of culinary articles, in particular those that allow the detection of their temperature via a cooking plate. From a general viewpoint, this involves determining the temperature of a culinary article so as to optimise the cooking of a food item, or to protect the cooking utensil, independently of the size of the article.

More precisely, the invention concerns a culinary article with a bottom in which are placed heat-sensitive means, created from electrically conducting materials.

BACKGROUND

Such an article is well known to those skilled in the art, in particular through the example provided in the document containing the example of the prior art, namely JP 5344926. This document describes a cooking system with a culinary article and a cooking plate. The culinary article is fitted with heat-sensitive means, and with a secondary coil forming a closed circuit with the heat-sensitive means. The cooking plate is fitted with a primary coil, a means for the generation of high frequencies that induces a current in the secondary coil, and a temperature detection means that determines the temperature of the culinary article according to the magnitude of the current flowing in the primary coil.

The drawback of such a configuration is that it requires firstly the incorporation of a coil into the removable receptacle, and secondly positioning of the secondary coil and the heat-sensitive means within a protective container at the centre of the top face of the bottom of the receptacle.

One is also familiar with document DE 4413979. This document describes a cooking system with a culinary article and a cooking plate. In its bottom, the culinary article includes a sensor interacting with a second sensor located in or on the cooking plate. The sensor of the culinary article is essentially a so called "binary" multi-layer ceramic sensor that is used to detect the attainment of target temperatures by a sudden change in the dielectric constant at the target temperatures. The cooking plate includes a set of sensors or of electrodes, connected capacitively to the dielectric of the sensor located in the bottom of the culinary article.

The drawback of such a configuration is that it is limited to capacitive measurements and that the measurement of temperature is not fine, because of the constraints of the target values.

Finally, document US 2005/0258168 describes a plate for the grilling of food items. This induction-type cooking plate is fitted with a plate, on which the food items to be grilled are placed, this plate being equipped with a ferromagnetic material for the measurement of temperature.

The drawback of such a configuration is that it requires a particular steric arrangement for positioning the inductive heating means and the measuring means. In addition, it requires two measuring coils for one heating coil.

The purpose of this present invention is to remedy these drawbacks by proposing a simple device that is easy to use and to maintain.

SUMMARY

With this objective in view, the culinary article according to the invention, which in fact conforms to the foreword provided above, is essentially characterised in that the heat-sensitive means are created from non-ferromagnetic materials whose resistivity varies with the temperature.

Thus, the temperature of the culinary article can be measured accurately, given that the resistivity varies continuously as a function of the temperature, and this measurement is more representative of the temperature of the food items since it is taken directly on the culinary article and not on the cooking plate.

Measurement of the temperature can be effected during the heating of the culinary article by measuring means that are located remotely in the cooking plate and that have no contact with the article. Because of the direct processing effected by the electronics of the cooking plate, it is not necessary to introduce these electronic circuits (for measurement, transmission, etc.) into a handle of the culinary article or to place a temperature probe in contact with the culinary article and the electronics of the plate. Regulating the temperature of the culinary article does not involve any signal transmission, such as communication by infrared or radio for example, between the cooking plate and the article.

Moreover, the temperature measurements effected are discrete measurements whose frequency are advantageously periodic and can be chosen or even modulated as a function of the temperature or the type of non-ferromagnetic material.

Furthermore, the culinary article can be used on any conventional type of heating means (induction, radiation, gas, etc.), with no danger of damaging the heat-sensitive means.

BRIEF DESCRIPTION OF THE DRAWINGS

Other characteristics and advantages of this present invention will appear more clearly on reading the description that follows, which is provided by way of an illustrative and non-limiting example and which makes reference to the appended figures in which.

DETAILED DESCRIPTION

Figure 1:
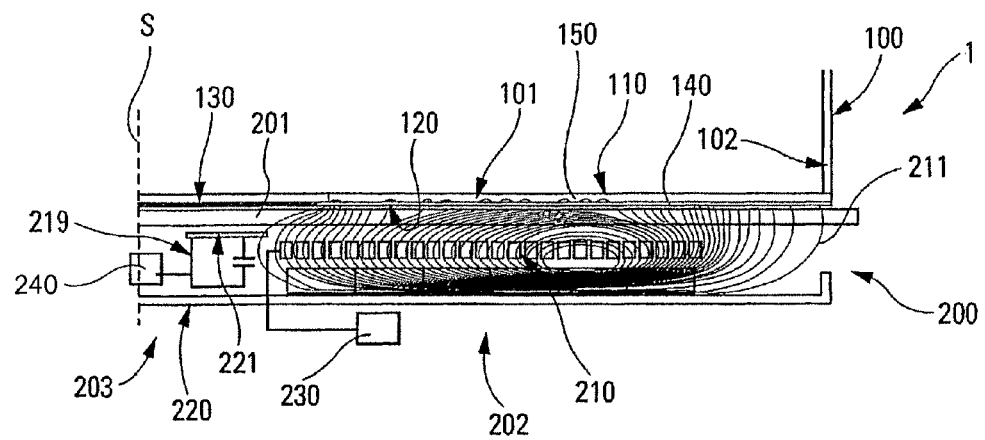
FIG. 1 represents a cross section of part of a cooking system (in operation) that includes a culinary article according to one embodiment of this present invention, and a cooking plate, where the heating means of the cooking plate are in the heating state and the measuring means are in the shut-down state.
Figure 2:
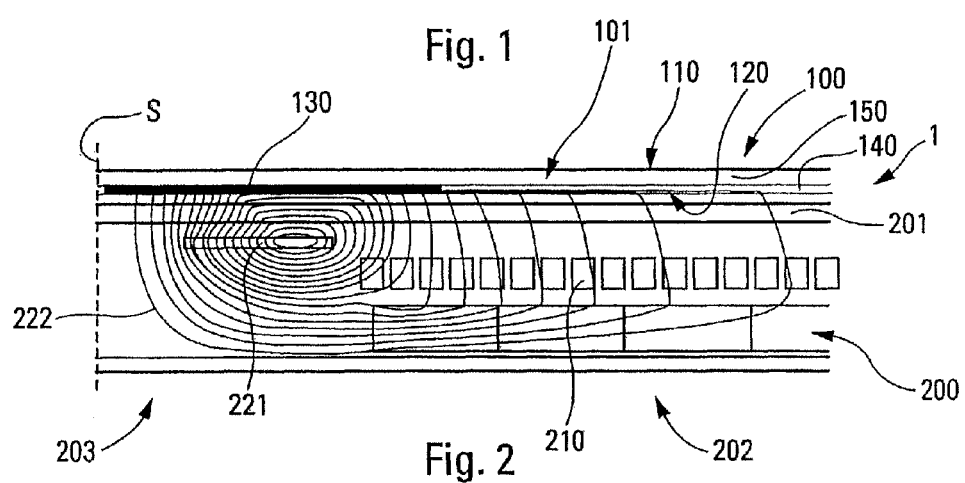
FIG. 2 is similar to FIG. 1, but with the heating means being in the shut-down state and the measuring means in induction mode.

As can be seen in FIGS. 1 and 2, a cooking system (1) for the cooking of food items includes a culinary article (100) that is designed to receive food items or a cooking liquid (water, oil, etc.), such as a fry pan or a saucepan, and a cooking plate (200) that is designed to support the culinary article (100) and to transmit to the latter the energy necessary to cook the food item that it contains.

As represented in FIGS. 1 and 2, the culinary article (100) includes a base body (150), made from a heat-conducting base material, such as aluminum. This base body generally determines the geometrical structure of the culinary article and can act as a base for any internal and/or external covering (enamel, paint, Teflon coating, etc.).

The culinary article (100) forms a volume for the reception of a food item to be cooked. It is bordered by a bottom (101) and a side wall (102). The bottom (101) of the culinary article (100), here of circular form, has an inner face (or top face) (110) that is intended to be in contact with the food items, and an outer face (or underside) (120) that is intended to be in contact with the cooking plate (200).

At least one part of at least one of the faces (110, 120) of the bottom (101) is of substantially flat appearance, so as to provide stability to the culinary article (100) when the latter is placed on a horizontal surface (cooking plate (200), table, etc.). Here, the faces (110, 120) of the bottom (101) are entirely flat and the thickness of the bottom (101) is constant.

Here also, the bottom (101) is formed mainly by the material of the base body (150).

The culinary article (100) includes heat-sensitive means (130) that are conductors of electricity. These heat-sensitive means are intended to allow determination of the temperature of the culinary article (100).

The material chosen for the heat-sensitive means (130) preferably exhibits high variability of its resistivity ($\rho$) over a given temperature range (preferably from 20° C. to 300° C.), enabling one to achieve accurate measurements of temperature. Moreover, in order to facilitate the calculations employed to determine the temperature, it is preferable that the variation of resistivity ($\rho$) as a function of the temperature (in the given temperature range) should be linear and, in order to achieve high precision in the measurement of the temperature, that the temperature coefficient (TC) should be high. In addition, preferably, and for reasons that will be shown later, the heat-sensitive means (130) are non-ferromagnetic. For all these reasons, in this present embodiment, the heat-sensitive means are made of titanium.

The heat-sensitive means (130) are incorporated into the bottom (101) of the culinary article (100). In this present embodiment, the heat-sensitive means (130) are of constant thickness. Here, the heat-sensitive means (130) are formed by a heat-sensitive element (130) (an insert incorporated into the base body (150)). Preferably and for reasons that will be shown later, the heat-sensitive means (130) (here one face of the insert (130)) constitute a part of the outer wall (102) of the bottom (101) of the culinary article (100) (here the central part), as represented in FIGS. 1 and 2.

In this present embodiment, the heat-sensitive means (130) are shaped to have a symmetry of revolution whose axis (S) is perpendicular to the plane of the bottom (101). In this case, the insert (130) has the appearance of a disk that is concentric with the bottom (101) of the culinary article (100).

Moreover, in this present embodiment, as illustrated in FIGS. 1 and 2, the culinary article (100) also includes ferromagnetic means (140). These ferromagnetic means (140) are intended to allow heating of the food items when the cooking plate (200), on which the culinary article (100) is resting, is a magnetic induction plate, and they are configured to convert an incident magnetic field (represented in FIG. 1 by field lines (211)) coming from the cooking plate (200) into heat, by the Joule effect (induced by Foucault (eddy current) currents).

In this present embodiment, the ferromagnetic means (140) are incorporated into the bottom (101) of the culinary article (100), and more precisely into the base body (150). In this present embodiment, the ferromagnetic means (140) extend in the form of a crown (140), and can take the form of a grill or of heat-welded capsules.

According to the invention, the heat-sensitive means (130) and the ferromagnetic means (140) are arranged in relation to each other so that the heat generated by the ferromagnetic means (140) is transmitted by thermal conduction to the heat-sensitive means (130). Here, the crown (140) of ferromagnetic material is in contact with the circular insert (130) in heat-sensitive material that surrounds it.

As represented in FIGS. 1 and 2, the cooking plate (200) includes a reception surface (201) that is designed to receive the culinary article (100) (more precisely, the underside (120) of its bottom (101)). The cooking plate (200) includes at least one heating centre (one only in this case).

The cooking plate (200) includes a heating system (202) and a temperature measuring system (203).

The heating system (202) includes heating means (210) and regulating means (230). With each heating centre there are heating means associated (210) that belong to it alone.

The means of regulation (230), such as a microcontroller and its operating program, are used, for example, to regulate the heating means (210) to around a setpoint, to trigger a timer, etc.

In this present embodiment, as represented in FIGS. 1 and 2, the heating means (210) are inductive. To this end, they include an inductor, which in this case is an inductive heating coil (210). Each heating centre includes at least one inductive heating coil (210) (only one in this case). In addition, the cooking plate (200) includes first thermal protection means that are used to thermally protect the heating means (210) when they are inductive.

In this present embodiment, the heating system (202) is configured so that the heating means (210) supply heating that is sequenced over time, and that pass successively and alternately into a heating state in which they generate and transmit the cooking energy, and into shut-down state in which they are no longer generating this energy. In this case, since the heating means (210) are inductive, they are fed by an alternating current at frequency $f_1$, amplitude modulated at frequency $f_3$, with the zero (and the adjacent zone as explained below) of the modulation corresponding to the shut-down state, and the remainder to the heating state. A typical frequency for $f_1$ is 18 to 25 kHz for example. A typical modulation is at a frequency $f_3$ of 50 Hz or 60 Hz, 100 Hz or 120 Hz after rectification).

The temperature measuring system (203) includes measuring means (220) and control means (240).

The measuring means (220) include an electrical circuit (219) with at least one element of an inductive nature (221), independently of the nature (inductive or not) of the heating means (210). In this present embodiment, the element of an inductive nature is an inductor (221), which in this case is an inductive measuring coil (221). As can be seen in FIGS. 1 and 2, the inductive measuring coil (221) is positioned at the centre of the inductive heating coil (210).

The magnetic field (represented in FIG. 2 by field lines (222)) generated by the inductive measuring coil (221) is of much lower amplitude than that generated by the inductive measuring coil (210) and does not allow the heating of a ferromagnetic material by induction.

The inductive measuring coil (221) is used to measure, by induction, the amplitude of the current flowing in the heat-sensitive element (130) of the culinary article (100) when the latter is positioned on the reception surface (201). In fact, the inductive measuring coil (221) can be compared to the primary circuit of a transformer, while the heat-sensitive means (130) of the culinary article (100) in are the secondary circuit.

The measurement principle is based on variation of the impedance (Z) of the electrical circuit (219) (in this case an LCR circuit consisting of the inductive measuring coil (221) and a capacitor with the value (C) mounted in series with the inductive measuring coil (221)) according to the variation in the temperature of the heat-sensitive elements (130). The measuring coil (221) is characterised by an inductance ($L_B$) (whose variation as a function of the temperature is sufficiently small to be neglected) and a resistance ($R_B$). The value of the impedance (Z) of the electrical circuit (119) (primary circuit) is a function of the resistance ($R_B$) of the inductive measuring coil (221) (whose value is known) and the resistance ($R_S$) of the secondary circuit formed by the heat-sensitive material (130) (whose value depends on the temperature). To the values of the voltage (U) applied to the electrical circuit (119) and of the impedance (Z), there corresponds the amplitude (I) of the current flowing in the inductive measuring coil (221), according to the relation U=Z*I.

The measurement of the amplitude of the current (I) flowing in the inductive measuring coil (221) is used to determine the impedance (Z) of the electrical circuit (119) and therefore the resistance (R) of this circuit (119), to deduce from this the resistance ($R_S$) of the heat-sensitive means (130) and therefore their resistivity ($\rho$) (the dimensions of these means being known) and their temperature.

The control means (240) are used to determine the temperature of the culinary article (100) from measurement of the amplitude (I) of the current flowing in the inductive measuring coil (221), with the measuring means (220) transmitting to the control means (240) a signal whose value is representative of the impedance (Z) of the circuit (119) (which in this case is the amplitude (I) of the current flowing in the inductive measuring coil (221)).

The control means (240) include at least a model of the thermal behaviour of the resistivity ($\rho$) of the heat-sensitive material (130) incorporated into the bottom of the culinary article (100). It is easy to understand that the use of heat-sensitive means (130) with constant temperature coefficient (TC) (actually or to an acceptable approximation) in the range of working temperatures of the culinary article (100), greatly facilitates the determination of temperature from a value of the resistivity ($\rho$), since the model is then linear. In order to effect this determination, the control means (240) advantageously include a microprocessor.

In order to facilitate determination of the temperature (more precisely, and so as to facilitate correlation between the variation of the resistance (R) and of the amplitude (I), it is advantageous for the inductive measuring coil (221) to be powered by a voltage (U) (in this case, a rectangular pulsed voltage) whose frequency ($f_2$) is the resonant frequency ($f_r$) of the electrical circuit (119), calculated from $1/(2\pi\sqrt{L_B \cdot C})$. At this frequency, the impedance (Z) of the electrical circuit (119) is equal to its resistance (R), and the applied voltage (U) and current amplitude (I) in this circuit (119) are proportional (U=R*I). In practice, the capacitor (C) is chosen according to the frequency ($f_2$) of the available power supply, and the inductance ($L_B$) of the inductive measuring coil (221). The inductive measuring coil (221) can therefore be used to measure any variation in resistance (R) that can be correlated with a variation of temperature in the culinary article (100).

Moreover, the resistance ($R_S$) of the heat-sensitive means (130) depends, amongst other things, on the depth of penetration ($\delta$) of the magnetic field created by the inductive measuring coil (221), and this depth of penetration ($\delta$) depends on both the resistivity ($\rho$) and the magnetic permeability ($\mu_r$) of the heat-sensitive means (130), in accordance with the formula $\delta=\sqrt{(\rho/\pi\cdot\mu_o\cdot\mu_r\cdot f)}$, where $\mu_o$ is the magnetic permeability of a vacuum, and f is the frequency of the inductive measuring coil (221) (here $f_2$). Now if these two properties ($\delta$ and $\mu_r$) vary at the same time, it is extremely difficult to associate the variation in the resistance (R) measured by the inductive measuring coil (221) (in fact the amplitude I) with the temperature of the culinary article (100). As a consequence, it can be seen easily that it is very advantageous for the heat-sensitive means (130) to be non-ferromagnetic, with the magnetic permeability ($\mu_r$) then being comparable to 1, and not dependent on the temperature, unlike a ferromagnetic material.

In practice, once the nature of the non-ferromagnetic material of the heat-sensitive means (130) has been determined, their thickness (E) is chosen according to the frequency ($f_2$) of the voltage (U) powering the inductive measuring coil (221) so as to be greater than the depth of penetration ($\delta$) associated with this frequency ($f_2$).

Reciprocally, the frequency ($f_2$) of the voltage (U) powering the inductive measuring coil (221) can be determined according to the thickness (E) of the heat-sensitive means (130) and the desired depth of penetration ($\delta$). In this present embodiment, the non-ferromagnetic, titanium, heat-sensitive means (130) have a thickness of 1.2 mm for a frequency ($f_2$) of 50 kHz.

Another advantage of employing a non-ferromagnetic material as a heat-sensitive means (130) is that, in this case, the inductance ($L_s$) (which is known) of the inductive measuring coil (221) varies very little in its presence.

Thus, in this particular case, the only element that is variable as a function of the temperature in the impedance (Z) of the circuit (119) is the resistivity ($\rho$) of the heat-sensitive means (130) (and therefore, the only property of the heat-sensitive means (130) to participate in the measurement of the temperature, when they are made from a non-ferromagnetic material, is the variation of their resistivity ($\rho$)), enabling one to achieve an accurate measurement with ease. In order to improve the measurement, the heat-sensitive means (130) are advantageously positioned in relation to the inductive measuring coil (221). In addition, the area of the heat-sensitive means (130) is preferably greater than that of the inductive measuring coil (221), increasing the reliability of the measurement.

Thus, the measurement of temperature in the culinary article (100) occurs independently of the heating of this article, and can take place immediately it is placed on the cooking plate (200), independently of any activation of the heating means (210), and independently of the size of the culinary article (100).

Moreover, in this present embodiment, the cooking plate (200) includes second means of thermal protection that are used to thermally protect the measuring means (220). These second means of thermal protection can be either specific, or performed by the first thermal protection means.

In this present embodiment, since the heating means (210) are inductive, in order not to disrupt measurement of the temperature of the culinary article, the latter is effected preferably around the passage through zero of the modulation of the power current of the heating means (210), so as to avoid induction phenomena between the inductive heating means (210) and the inductive measuring means (220), although the respective frequencies ($f_1$, $f_2$) are preferably quite different (the frequencies can be different or not in fact).

Figure 3:
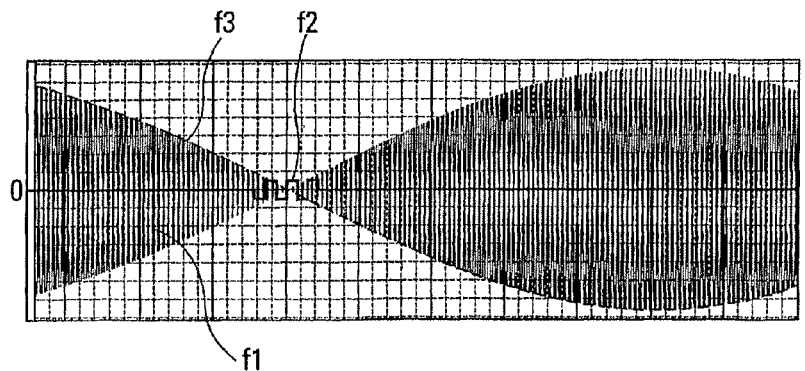
FIG. 3 represents the general principle of the behaviour of the voltage in the measuring means and of the current in the heating means.

To this end, and in order not to suffer damage, when in operation, the inductive measuring coil (221) passes successively and alternately through shut-down mode, in which it is powered by a zero voltage (open circuit), and induction mode, in which it is powered by the rectangular pulsed voltage (U) of frequency $f_2$. For a same arbitrary time unit, FIG. 3 represents the behaviour of the voltage at the terminals of the inductive measuring coil (221) at frequency $f_2$, and the behaviour of the modulated current in the inductive heating coil (210) at frequency $f_1$ modulated by frequency $f_3$.

This figure, which is schematic and simulated, mainly illustrates the differences between the frequencies ($f_1$, $f_2$) of the inductive heating (210) and measuring (221) coils, and the fact that the inductive measuring coil (221) is powered only during approximately the passage through zero of the modulation current of the inductive heating coil (210).

In this present embodiment, in contrast to FIG. 3, which represents the operating principle around the passage through zero of the modulation, when the voltage of the inverter generating the modulation frequency $f_3$ falls below a certain limit (30-40V for example), the latter intentionally stops (the modulation waves are not as regular as in FIG. 3). As a consequence, there exists a time (one to two milliseconds for modulation at 50 Hz) around the passage through the theoretical zero of the modulation, in which the field of the inductive heating coil (210) is zero, and therefore in which the heating means (210) are in their shut-down state. This time is sufficient to perform the measurement.

In the preferred embodiment, the cooking plate (200) includes additional measuring means (not shown) that are designed to measure the temperature of the reception surface (201), such as means of the NTC type (means whose electrical resistivity is a function of a Negative Temperature Coefficient). These additional measuring means (used conventionally in cooking plates (200)) are connected to the temperature measuring system (203) (and more particularly to the control means (240)), and are used to correlate the measurement effected by the inductive measuring coil (221) with the measurement that they perform themselves, and to calibrate the temperature measuring system (203). This comparison of the temperatures can take place only at the start of heating of the culinary article (100) or at any time during this heating process.

The detection of a temperature by the inductive measuring coil (220) and/or by the additional measuring means can also be used to determine the attainment of a target maximum temperature, generating a shut-down of heating, and thus protecting the culinary article (100).

In use, in this present embodiment, the culinary article (100) is positioned on the induction cooking plate (200). Following activation of the heating means (210), by the selection of a function or a programme for example (to simmer, to boil water, to cook in oil, to cook without fat, etc.), the inductive heating coil (210) produces a magnetic field that induces currents in the ferromagnetic means (140) in the bottom (101) of the culinary article (100), which results, through the Joule effect, in heating of these ferromagnetic means (140) and then, by thermal conduction, the rest of the culinary article (100), including the heat-sensitive insert (130).

With the variation of temperature, the resistivity ($\rho$) and the resistance ($R_S$) of the heat-sensitive means (130) change as well as the resistance (R) and the impedance (Z) of the electrical circuit (119). Because of using a non-ferromagnetic material as the heat-sensitive means (130), and powering the inductive measuring coil (221) with a voltage (U) whose frequency ($f_2$) is the resonant frequency ($f_r$) of the electrical circuit (119), the amplitude (1) sent by the measuring means (220) to the control means (240) allows the latter to easily determine the temperature of the culinary article (100) from this amplitude (I).

Moreover, the temperature measuring system (203) can also be used for other functions such as detecting the presence of a culinary article (100) on the cooking plate (200), or even its central positioning, or recognising the type of culinary article (100) or its compatibility with the cooking plate (200), combined, for example, with the generation of an error signal or disabling of the heating means. In fact, the presence of a metallic material close to the measuring means (220) modifies the impedance of the circuit (119), and this change is detected by the control means (240) without necessarily converting this impedance change into temperature.

The present invention is not limited to this present embodiment.

Concerning the bottom of the culinary article, it is possible that its faces may exhibit a slight concavity, that its thickness may not be constant, or that its shape has a form other than circular, such as an oval or rectangular (square) shape.

Concerning the material used to create the heat-sensitive means, it is possible to employ metals such as titanium, bismuth, molybdenum (in particular molybdenum disilicide (MoSi2)), platinum, copper, aluminum, magnesium, zinc or nickel, or alloys of these metals, or indeed metallic ceramics, austenitic steels or non-ferrous enamels.

Concerning the heat-sensitive means, these can have a shape other that a disk, such as the creation of an assembly with at least one crown or a number of concentric crowns with the centre of the bottom of the culinary article, and preferably linked together thermally. They may present a relief or have cut-outs (which are preferably located in the plane of the bottom of the culinary article). They can also, at least in part, be covered with a material that is transparent to a magnetic field, like an enamel or a paint, which forms at least part of the underside of the bottom of the culinary article, so that the culinary article can be cleaned easily with no danger of damaging the heat-sensitive means.

The heat-sensitive means may not take the form of an insert, but can be deposited in the form of one or more layers or coats, by screen printing or thermal spraying for example. They can also be formed by several non-ferromagnetic materials superimposed onto each other, such as by lamination or deposition in coats or layers.

Concerning the ferromagnetic means, these can be away from the heat-sensitive means, as long as the heat-sensitive means are not isolated thermally.

Concerning the cooking plate, the latter can include several heating centres, each of which is respectively fitted with a measuring coil. In this case, the cooking plate can consist of only a single measuring system for all of the heating centres, connected by multiplexing to the various measuring coils of the heating centres.

Concerning the control means, these can include several thermal behaviour models, with each model corresponding to one given heat-sensitive material, so as to increase the flexibility in use of the cooking plate. In addition, a thermal behaviour model can include several thermal behaviour schemes for a large number measuring frequencies, which then allows recognition of the heat-sensitive material of the culinary article. In addition, the control means could be coupled with the regulation means, such as in the form of an electronic circuit, or incorporated together into a microprocessor.

Concerning the measuring system, the power-supply voltage of the measuring means can take the form of multi-frequency excitation, or can be in the form of Dirac pulses.

In order to obtain a measurement of the temperature around at least one passage through zero of the current modulation, in particular if the time for determination of the temperature is relatively long, it is possible to perform a measurement every N passages through zero of the modulation, where N is an natural integer (every five to ten seconds for example, with modulation at 50 Hz) and to stop the inverter for a half wave so as to reach zero current in the inductive heating coil without disturbing the heating of the article.

The invention claimed is:

1. A method of sensing a temperature of a culinary article, comprising:
   providing a culinary article without a coil comprising a bottom, the culinary article configured to be supported by a plate including heating means and a temperature measuring system;
   placing heat-sensitive means in the bottom, the heat-sensitive means made of electrically conductive materials which are non-ferromagnetic and have a temperature-variable resistivity; and
   allowing, by the heat-sensitive means, the plate to measure a temperature of the culinary article based on the resistivity of the heat-sensitive means.

2. A cooking apparatus comprising:
   a culinary article comprising a bottom, the culinary article configured to be supported by a plate fitted with measuring means distinct from heating means; and
   heat-sensitive means placed in the bottom, the heat-sensitive means made of electrically conductive materials, which are non-ferromagnetic and have a temperature-variable resistivity, the heat-sensitive means configured to allow the plate to measure a temperature of the culinary article based on the resistivity of the heat-sensitive means.

3. The method of claim 1, further comprising measuring, by the plate, the temperature of the culinary article using the variation of resistivity to the temperature of the heat-sensitive means.

4. The method of claim 1, further comprising providing the heat-sensitive means as a material whereof the resistivity varies linearly with the temperature in a temperature range of 20 to 300° C.

5. The method of claim 1, further comprising providing the heat-sensitive means as a metal including titanium, platinum, copper, aluminium, magnesium, zinc, bismuth, molybdenum, and nickel, or from an alloy of these metals, or from a metallic ceramic, austenitic stainless steel or non-ferrous enamels.

6. The method of claim 1, wherein placing the heat-sensitive means includes placing the heat-sensitive means in a central part of the bottom.

7. The method of claim 1, wherein placing the heat-sensitive means includes inserting the heat-sensitive means in the form of an insert into the bottom.

8. The method of claim 1, wherein placing the heat-sensitive means includes depositing the heat-sensitive means in the form of at least one layer of heat-sensitive material onto the bottom.

9. The method of claim 1, wherein placing the heat-sensitive means includes placing the heat-sensitive means in the form of co-rolling.

10. The method of claim 1, wherein placing the heat-sensitive means includes placing at least part of the heat-sensitive means as at least part of a face of the bottom.

11. The method of claim 1, further comprising covering at least part of the heat-sensitive means by a material which is transparent to a magnetic field and which constitutes at least part of a face of the bottom.

12. The cooking apparatus of claim 2, further comprising ferromagnetic means integrated into the bottom and arranged relative to the heat-sensitive means so as to transmit to the latter the heat which they produce under the effect of an induction magnetic field.

13. The cooking apparatus of claim 12, wherein the ferromagnetic means are distant from the heat-sensitive means.

14. The cooking apparatus of claim 2, wherein the variation of resistivity to the temperature of the heat-sensitive means is used for measuring the temperature of the culinary article.

15. The cooking apparatus of claim 2, wherein the heat-sensitive means are made of materials whereof the resistivity varies linearly with the temperature in a temperature range of 20 to 300° C.

16. The cooking apparatus of claim 2, wherein the heat-sensitive means are made from a metal including titanium, platinum, copper, aluminium, magnesium, zinc, bismuth, molybdenum, and nickel, or from an alloy of these metals, or from a metallic ceramic, austenitic stainless steel or non-ferrous enamels.

17. The cooking apparatus of claim 2, wherein the heat-sensitive means are placed in a central part of the bottom.

18. The cooking apparatus of claim 2, wherein the heat-sensitive means are in the form of an insert inserted into the bottom.

19. The cooking apparatus of claim 2, wherein the heat-sensitive means are in the form of at least one layer of heat-sensitive material deposited onto the bottom.

20. The cooking apparatus of claim 2, wherein the heat-sensitive means are in the form of co-rolling.

21. A method of sensing a temperature of a culinary article, comprising:
   providing a culinary article without a coil comprising a bottom;
   depositing heat-sensitive means in the form of at least one layer of heat-sensitive material onto the bottom, the heat-sensitive means made of electrically conductive materials which are non-ferromagnetic and have a temperature-variable resistivity; and
   allowing, by the heat-sensitive means, a plate fitted with non-inductive heating means to measure a temperature of the culinary article.

22. A cooking apparatus comprising:
   a culinary article comprising a bottom;
   heat-sensitive means placed in the bottom, the heat-sensitive means made of electrically conductive materials, which are non-ferromagnetic and have a temperature-variable resistivity, the heat-sensitive means configured to allow a plate fitted with heating means and measuring means distinct from the heating means to measure a temperature of the culinary article; and
   ferromagnetic means integrated into the bottom and arranged relative to the heat-sensitive means so as to transmit to the latter the heat produced under the effect of an induction magnetic field, the ferromagnetic means being distant from the heat-sensitive means.

23. A cooking apparatus comprising:
   a culinary article comprising a bottom; and
   heat-sensitive means in the form of at least one layer of heat-sensitive material deposited onto the bottom, the heat-sensitive means made of electrically conductive materials, which are non-ferromagnetic and have a temperature-variable resistivity, the heat-sensitive means configured to allow a plate fitted with heating means and measuring means distinct from the heating means to measure a temperature of the culinary article.

* * * * *